(12) United States Patent
Pittman et al.

(10) Patent No.: US 7,428,516 B2
(45) Date of Patent: Sep. 23, 2008

(54) HANDWRITING RECOGNITION USING NEURAL NETWORKS

(75) Inventors: James A. Pittman, Issaquah, WA (US); Mitica Manu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 11/159,301

(22) Filed: Jun. 23, 2005

(65) Prior Publication Data

US 2007/0009151 A1    Jan. 11, 2007

(51) Int. Cl.
*G06N 5/00* (2006.01)
(52) U.S. Cl. .......... 706/20; 382/187; 715/863
(58) Field of Classification Search .......... 706/20; 382/187; 715/863
See application file for complete search history.

(56) References Cited

U.S. PATENT DOCUMENTS

| | | | |
|---|---|---|---|
| 5,550,930 A | | 8/1996 | Berman et al. |
| 5,596,698 A | * | 1/1997 | Morgan ............... 715/863 |
| 5,633,954 A | * | 5/1997 | Gupta et al. ............ 382/187 |
| 5,757,960 A | * | 5/1998 | Murdock et al. ........ 382/187 |
| 5,812,698 A | | 9/1998 | Platt et al. |
| 5,991,441 A | | 11/1999 | Jourjine |
| 6,011,865 A | | 1/2000 | Fujisaki et al. |
| 6,285,786 B1 | | 9/2001 | Seni et al. |
| 6,393,395 B1 | | 5/2002 | Guha et al. |
| 6,453,070 B1 | | 9/2002 | Seni et al. |
| 6,493,464 B1 | | 12/2002 | Hawkins et al. |
| 6,754,386 B1 | | 6/2004 | Williamson et al. |
| 2004/0213455 A1 | | 10/2004 | Lossev et al. |

FOREIGN PATENT DOCUMENTS

CA    2 433 929 A1    1/2005
WO    WO 94/22107    9/2004

OTHER PUBLICATIONS http://www.neuroxl.com/?3, Dated Jun. 23, 2005, 2 pp.
http://www.microth.com/inpad/, Dated Jun. 23, 2005, 2 pp.
http://www.neuralware.com/products.jsp, Dated Jun. 23, 2005, 2 pp.

* cited by examiner

*Primary Examiner*—Wilbert L Starks, Jr.
(74) *Attorney, Agent, or Firm*—Lee & Hayes, PLLC

(57) ABSTRACT

New neural networks for handwriting recognition may be build from existing neural networks. An existing neural network pre-trained for a starting language is chosen based on a desired target language. The neural network is modified so that it may be used to recognize characters of the target language, and the modified neural network is used in a handwriting recognizer for the target language. Modification includes copying one or more of the primary outputs of the existing neural network. An appropriate starting language may be chosen based on the desired target language. In addition, a "super network" may be provided that is a relatively large neural network configured to recognize characters from a number of different languages. One may customize a handwriting recognizer using such a super network by programming a mask to block outputs from the super network that are not necessary for the language desired to be recognized.

19 Claims, 11 Drawing Sheets

| Romanian (target) | English | Hebrew |
|---|---|---|
| A | A | ג |
| Ă | A | ג |
| Â | A | ג |
| B | B | ק |
| C | C | ▨ |
| D | D | ◻ |
| E | E | ▨ |
| F | F | ק |
| G | G | o |
| H | H | א |
| I | I | ו |
| Î | I | ו |
| J | J | ב |
| K | K | א |
| L | L | ו |
| M | M | ▨ |
| O | O | o |
| P | P | ק |
| R | R | ק |
| S | S | ל |
| Ş | S | ל |
| T | T | ד |
| Ţ | T | ד |
| U | U | ע |
| V | V | ע |
| X | X | א |
| Z | Z | ▨ |

Fig. 6

| Romanian (target) | English |
|---|---|
| A | A |
| Ă | A |
| Â | A |
| B | B |
| C | C |
| D | D |
| E | E |
| F | F |
| G | G |
| H | H |
| I | I |
| Î | I |
| J | J |
| K | K |
| L | L |
| M | M |
| O | O |
| P | P |
| R | R |
| S | S |
| Ş | S |
| T | T |
| Ţ | T |
| U | U |
| V | V |
| X | X |
| Z | Z |

Fig. 8

HANDWRITING RECOGNITION USING NEURAL NETWORKS

BACKGROUND

In recent years, computers more often include a user input mode having a touch-sensitive screen on which the user may write with a stylus. This allows the user to input handwritten electronic ink, which is widely considered, for many applications, to be one of the most convenient ways of interacting with a computer. For this mode of user input to be reliable, handwriting recognizers have been developed to interpret the user's handwritten input.

As the technology has matured, many handwriting recognizers now use a neural network that performs an initial analysis and categorization of handwritten input. The use of neural networks has been a major improvement in handwriting recognition; the accuracy of recognition has increased many-fold. To create an accurate neural network, the neural network must be trained—that is, they must be repetitively provided with actual samples of handwritten input and given feedback as to whether the neural network guesses correctly at the interpretation of the handwritten input. Effective training also means that the handwritten input samples are provided from a very large number of different people. This is because everyone has a different style of writing. The neural network should be robust enough to be able to recognize a wide range of writing styles, if user are to be happy with the end product.

Due to the sheer number of handwriting samples that must be obtained, and due to the massive amount of time that must be invested in properly training a neural network, training a neural network from scratch is extremely expensive. Moreover, training is typically performed for only a single language. In other words, a neural network may be particularly trained to recognize writing in the English language, or in the Chinese language. Because there are so many languages that exist in the world, high quality neural networks do not exist for many languages. In fact, for some lesser-known languages, neural networks may not exist at all. There is simply insufficient financial incentive for computer and/or software companies to invest substantial money in building and training neural networks for lesser-known languages.

SUMMARY

There is a need for a less expensive and/or easier way to provide handwriting recognition capabilities in languages for which no neural networks are available or for which no neural networks of sufficient quality are available. It is too expensive and time-consuming to build and train neural networks from scratch for a large number of languages.

Therefore, aspects of the disclosure herein are directed to building new neural networks from existing neural networks. An existing neural network for a starting language is chosen based on a desired target language. The neural network is modified so that it may be used to recognize characters of the target language, and the modified neural network is used in a handwriting recognizer for the target language. Modification includes copying one or more of the primary outputs of the existing neural network.

Further aspects of the disclosure herein are directed to choosing an appropriate starting language based on the desired target language. This may be performed manually by a person and/or automatically by a computer. Subjective and/or objective standards may be used to choose an appropriate starting language.

Still further aspects of the disclosure herein are directed to training the modified neural network to better recognize the target language. In particular, the copied primary outputs may be trained to respond to slightly different input combinations than the original primary outputs from which they were copied. This may allow the newly-copied primary outputs to respond to subtle differences in characters between the starting and target languages. Of course, training may be used to cause a copied node to respond to input combinations that are more than slightly different from those that the original node responds to.

Still further, a kit may be marketed that includes a number of different existing neural networks for various different starting languages, along with software on a computer-readable medium that assists a user with choosing an appropriate starting language, modifying one of the existing neural networks, and/or further training of the modified neural network.

According to yet further aspects of the disclosure herein, a "super network" may be provided that is a relatively large neural network configured to recognize characters from a number of different languages. This super network may be expected to be substantially larger than a typical neural network that is dedicated to only a single language. One may customize a handwriting recognizer using such a super network by programming a mask to block outputs from the super network that are not necessary for the language desired to be recognized. Other aspects described herein may use a super network as an existing network that may be modified or masked, or even both modified and masked in the same embodiment.

These and other aspects of the disclosure herein will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

FIGS. 6 and 8 compare a target language with potential starting languages.

DETAILED DESCRIPTION OF ILLUSTRATIVE EMBODIMENTS

Illustrative Computing Environment

Figure 1:
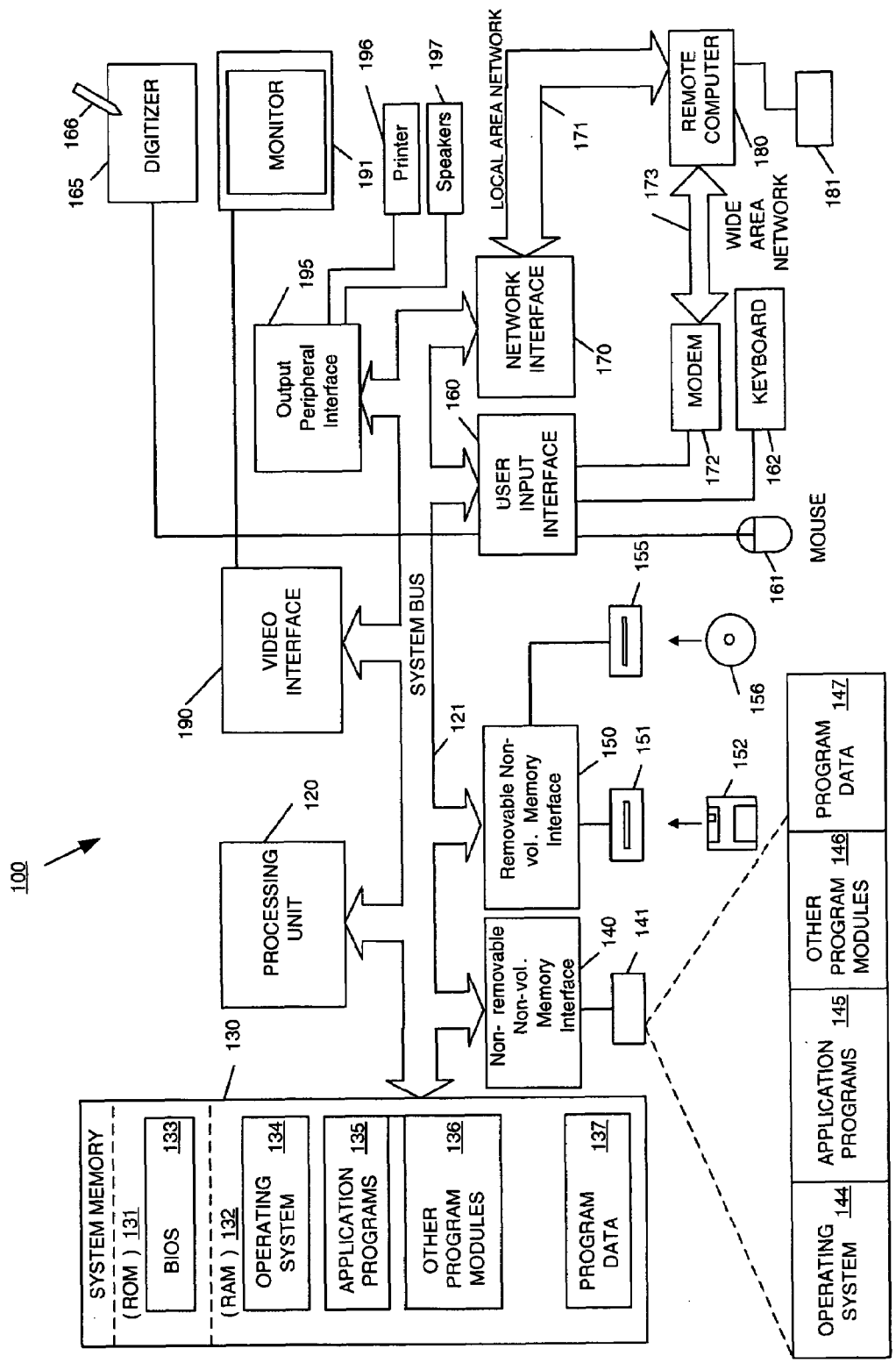
FIG. 1 is a functional block diagram of an illustrative computing environment.

FIG. 1 illustrates an example of a suitable computing environment 100 in which handwriting recognition functions and/or neural network creation, modification, and/or training may be implemented. Computing environment 100 is only one example of a suitable computing environment and is not intended to suggest any limitation as to the scope of use or functionality of the invention. Neither should computing environment 100 be interpreted as having any dependency or requirement relating to any one or combination of components illustrated in illustrative computing environment 100.

Other general purpose or special purpose computing system environments or configurations may be used. Examples of well known computing systems, environments, and/or configurations include, but are not limited to, personal computers (PCs); server computers; hand-held and other portable devices such as personal digital assistants (PDAs), tablet-style PCs or laptop PCs; multiprocessor systems; microprocessor-based systems; set top boxes; programmable consumer electronics; network PCs; minicomputers; mainframe computers; distributed computing environments that include any of the above systems or devices; and the like.

The disclosure herein is at times described in the general context of computer-executable instructions, such as program modules, being executed by a computer. Generally, program modules include routines, programs, objects, components, data structures, etc. that perform particular tasks or implement particular abstract data types. Distributed computing environments may further be used where tasks are performed by remote processing devices that are linked through a communications network. In a distributed computing environment, program modules may be located in both local and remote computer storage media including memory storage devices.

With reference to FIG. 1, illustrative computing environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer storage media and communication media. Computer storage media may include volatile, nonvolatile, removable, and non-removable media implemented in any method or technology for storage of information such as computer-readable instructions, data structures, program modules or other data. Computer storage media includes, but is not limited to, random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium that can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media.

System memory 130 includes computer storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162, a touch pad 165 (such as a digitizer) and stylus 166, and a pointing device 161 (commonly referred to as a mouse, track-ball or touch pad). Touch pad 165 may be a separate physical device or may be integrated with a display device such as a monitor 191. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). Monitor 191 or other type of display device is also coupled to system bus 121 via an interface, such as a video interface 190. Video interface 190 may have advanced 2D or 3D graphics capabilities in addition to its own specialized processor and memory. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

Overview of Handwriting Recognition

Computer 100 may be programmed with software and/or configured with hardware and/or firmware to recognize handwritten input by the user. The handwritten input may be in any form such as in the form of electronic ink. The term "handwriting recognition" as used herein and in the claims is defined to mean the conversion of handwritten input into a set of characters that correspond to the handwritten input. A "handwriting recognizer" performs handwriting recognition. To "recognize" handwritten input is to perform handwriting recognition on the handwritten input. Electronic handwritten ink is commonly used in and recognized by many conventional computing devices such as personal digital assistants (PDAs) and tablet-style personal computers (also commonly known as tablet PCs). Electronic ink may be stored in any conventional or yet-to-be-defined format. Several ink storage formats presently exist, such as that used by the Microsoft WINDOWS line of operating systems and the PalmSource PALM OS line of operating systems.

The term "character" as used herein and in the claims may have a different meaning depending upon the language (e.g., English, Romanian, Chinese, Hebrew, etc.). There are essentially three major categories of written language: alphabetic, syllabic, and logographic. An alphabetic written language uses a defined set of letters that generally describe how a word is pronounced. However, there is generally not a one-to-one correspondence between each letter and each sound in the pronounced word. Examples of an alphabetic written language are English and Romanian, both of which are based on the Latin alphabet. A syllabic written language uses a defined set of symbols ("syllabaries") that each represent a pronounced syllable or phoneme. There is typically a one-to-one correspondence between each syllabary and each sound of the pronounced word. An example of a syllabic written language is Japanese. A logographic written language uses a defined set of symbols that each represents an object or abstract idea. For example, Chinese uses a set of logographic symbols. It should be noted that many languages are not purely one category or the other. For example, written Chinese includes some symbols that represent pronunciation, and English includes symbols that represent abstract ideas (e.g., "&" and "$", as well as numerals).

Each language may thus have its own defined character set, and the meaning of the term "character" depends upon the language being referred to. In general, however, the term "character" as used herein and in the claims refers to an alphabetic letter, a syllabary, a logographic symbol, a grammatical notation, or some other symbol used by the written language in question. Characters resulting from handwriting recognition may be represented by computer 100 in any data format. For example, each character, word, or phrase may be represented by a unique predefined code, such as defined by the standard American Standard Code for Information Interchange (ASCII), or the Unicode system.

Figure 2:
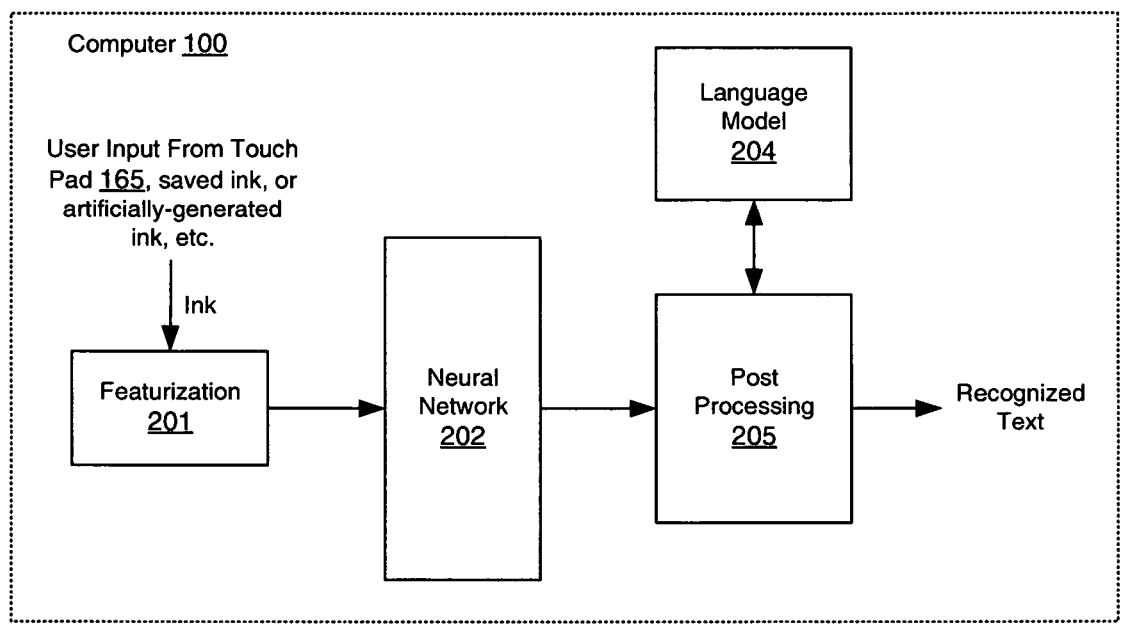
FIG. 2 is a functional block diagram of an illustrative handwriting recognizer.

FIG. 2 shows how computer 100 may be functionally configured to perform handwriting recognition. The various functions may be performed in software, hardware, and/or firmware, and may be part of an operating system, a software application, a device driver, and/or any other type of computer-executable code. The configuration shown in FIG. 2 is typical of conventional handwriting recognizers. As shown in this example, handwritten user input may be collected from touch pad 165 in the form of electronic ink. Computer 100 may then perform featurization 201 on the ink. Featurization refers to extracting certain features from the ink data that may be useful to the recognition process. Such features may include, for example, width, height, length (e.g., coordinate pair count and/or distance traveled in coordinate space, considered in two dimensions or computed separately in X and/or Y directions), maximum speed, count of direction reversals in the X and/or Y directions, detected cusps together with directionality and/or location (e.g., vertical position and/or horizontal position relative to the ink sample or to the writing area), detected ink crossings together with locations (in a similar manner as cusps), and/or Fourier transform frequency components in the X and/or Y directions.

Next, the features extracted during featurization 201 are provided to a set of primary inputs of a neural network 202. Neural network 202 is conventionally known and may be trained to associate a particular combination of inputs to the primary inputs. It should be noted that network 202 may be a network other than a neural network. For example, network 202 may be a Bayesian network, a hidden Markov machine (HMM), a support vector machine (SVM), a template matcher, and/or a dynamic time warping (DTW) unit.

Figure 3:
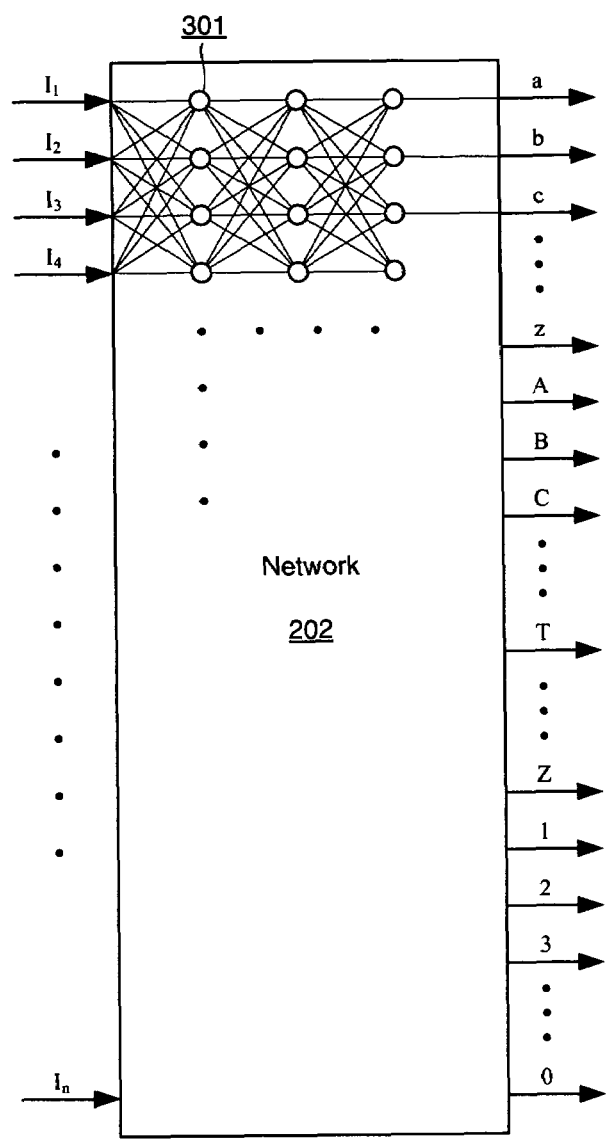
FIG. 3 shows an illustrative neural network that may be used in the handwriting recognizer of FIG. 2.

As shown in FIG. 3, neural network 202 has n primary inputs $[I_1, I_2, I_3, \ldots I_n]$, as well as a set of primary outputs [a, b, c, ... 0]. Although not all of the primary outputs are shown, neural network 202 has, in this example, a different primary output for each lower case and upper case letter, each numeral, and each other symbol of the English language. The primary outputs are coupled to the primary inputs by a network of "hidden nodes" such as hidden node 301. The hidden nodes may be organized in layers with full interconnection between each layer (such as is shown). However, the hidden nodes may be organized and interconnected in any manner desired. Each hidden node may act as an simple computer, similar to a biological neuron found in the mammalian brain. Neural networks using such hidden node architectures are well known.

Figure 4:
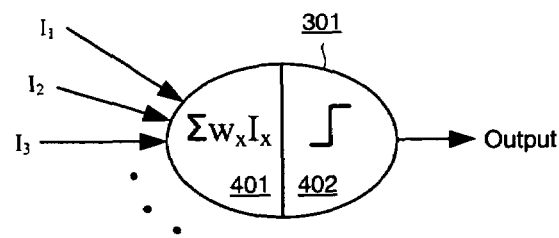
FIG. 4 shows an illustrative hidden node that may be part of the neural network of FIG. 3.

An illustrative configuration of hidden node 301 is shown in FIG. 4, as is conventionally known. In that figure, it is seen that hidden node 301 has a plurality of inputs and a single output. In this example, the inputs are some or all of the primary inputs. However, depending upon the location of the hidden node in neural network 202, the inputs may be outputs from other hidden nodes. Hidden node 301 as shown is functionally divided into a summing portion 401 and a threshold portion 402. Summing portion 401 provides a weighted sum of each input, where each input $I_x$ is assigned a corresponding weight $w_x$. The result of the sum is provided to threshold portion 402, which determines whether the result of the sum meets a predetermined criterion or set of criteria, such as exceeding a predefined value. If the criterion/criteria are not met, then a negative result (e.g., a logical zero) is output. But if the criterion/criteria are met, then a positive result (e.g., a logical one) is output. There are many variations on how a hidden node may be configured. For instance, there may be no threshold portion 402, or threshold portion 402 may output an analog value as opposed to being limited to a binary value. Neural network 202 may be trained to provide desired results using well-known techniques that adjust the weights w and/or the criteria defined in threshold portion 402 of the various hidden nodes.

Once neural network 202 has been trained, then in this example an appropriate set of input data to the primary inputs would result in the appropriate primary output being selected. A primary output may be considered to be selected in various ways. For example, if a primary output has a value that represents a positive result, that primary output may be considered to be selected. Or, if a primary output has a value that represents a more positive result than the other primary outputs along a range of possible positive results, then that primary output may be considered to be selected. Or, if a primary output has a value that meets a predetermined criterion or set of criteria (e.g., exceeds a threshold value), then that primary output may be considered to be selected.

To put the above discussion in context with the shown embodiment, consider the following. Each primary input of neural network 202 corresponds to a particular ink feature or set of features. Each primary output of neural network 202 corresponds to a different character from the same given language. In this particular example, it is assumed that the language is English. Assume that computer 100 extracts certain features from ink that provides a first combination of primary input values to neural network 202 (also assume that neural network 202 has already been properly trained). In response, neural network 202 selects a first primary output (e.g., primary output "B"). This means that neural network 202 has determined that the particular ink being analyzed most likely corresponds to handwritten letter "B." Now assume that the next piece of ink to be analyzed provides a second different combination of primary input values to neural network 202. In response, neural network 202 selects a different second primary output (e.g., primary output "3"). This means that neural network 202 has determined that the particular ink being analyzed most likely corresponds to handwritten numeral "3."

In some cases, neural network 202 may select more than one of the primary outputs in response to a given combination of primary input values. For example, in the first instance, it is possible that neural network 202 would select not only primary output "B, " but also primary output "8." This is a likely scenario, since the capital letter "B" and the numeral "8" often look similar, especially when the letter "B" is printed (i.e., not written in cursive). Or, when the handwriting is in cursive, it is likely that neural network 202 would select both primary outputs "e" and "o" in response to a cursive "e" handwritten input. Again, these two handwritten characters may look very similar. Processing techniques are known that deal with this situation (e.g., by examining the context of the character, such as by comparing the entire word to a known dictionary, to help determine which character is being written).

Referring again to FIG. 2, a post-processing function 205 may receive and interpret the primary outputs from neural network 202. Although in theory the raw primary outputs of neural network 202 themselves indicate the recognized characters corresponding to the handwritten input, in practice there may be expected to be a substantial amount of error. Such error is due in large part to the imperfections and quirks in each individual's handwriting; each user's handwriting is different, and each user does not write exactly the same way each time. Thus, it may be desirable to add post-processing function 205, which essentially filters out many of the errors by placing the recognized characters identified by the primary outputs of neural network 202 in context with each other. This may be performed by using a search engine that references a language model 204. Both post-processing function 205 and language model 204 are well known.

Language model 204 defines various rules or guidelines for expected recognized text. Such rules may include a list of known words in the relevant language, a set of grammatical rules, a set of special formats (e.g., date, time, etc.), bi-grams, and/or tri-grams. Each time a new character is recognized by neural network 202, post-processing function 205 consults language model 204 to see if the newly-recognized character fits in with any of the language model rules. This is an iterative and dynamic process; as each new character is recognized, assumptions about which language rules should be applied are made and dropped. Again, this post-processing function is well-known. Based on the language model rules, the final recognized text is output by post-processing function 205.

Re-Using Existing Networks

As has been described, many handwriting recognizers use neural networks to help interpret handwritten input. A neural network is typically trained to recognize writing for one language. For example, an English language neural network may exist, a French language neural network may exist, and a Japanese neural network may exist. Each neural network may recognize its own unique set of characters, depending upon the language. In addition, a recognizer using a neural network trained for a given language will also use a particular language model that is consistent with the given language. For example, English, French, and Japanese language models may separately exist. Known handwriting recognizers -thus use a neural network for a given language as well as a language model for that given language.

However, there are a large number of possible languages for which trained handwriting recognition neural networks do not exist or are not easily accessible. This is because, as previously discussed, properly training a neural network for a given language can be quite expensive. Proper training often involves using handwriting samples from hundreds if not thousands of persons, each of which may include a wide variety of different combinations of characters, words, and other symbols.

Nevertheless, it is desirable to be able to provide handwriting recognition functions for a variety of languages that as of yet do not have acceptable handwriting recognizers available for those languages. As will be discussed in greater detail, instead of training neural networks from scratch, as has been done in the past, to recognize writing for a given language, one may re-use and modify existing pre-trained neural networks to recognize other languages for which the networks were not previously trained to recognize. Re-use of existing neural networks may save an extraordinary amount of time and money, as compared with training a new neural network from scratch.

Figure 10:
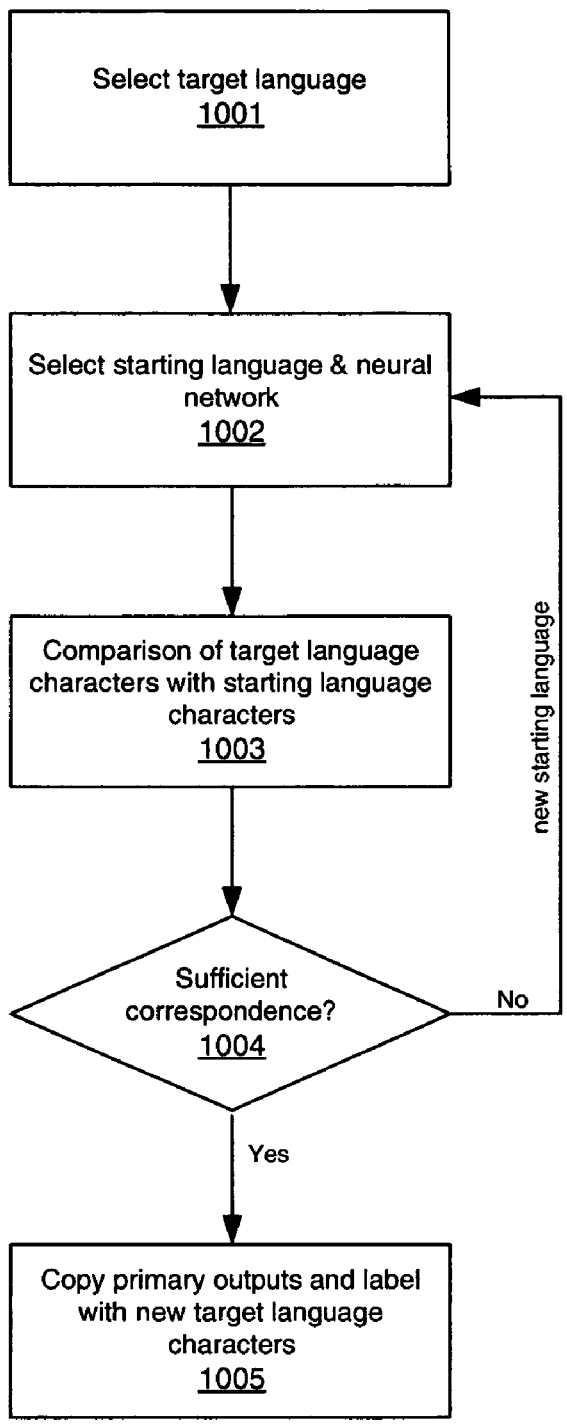
FIG. 10 is a flow chart of an illustrative handwriting recognizer creation process.

In general, neural networks may be re-used and modified to recognize a target language as follows, with reference to FIG. 10. In step 1001, a target language is selected. In step 1002, a starting language is selected, which may be based on the target language. An existing neural network for the chosen starting language may be already pre-trained to recognize written characters in the starting language. The starting language may be chosen based on, among other factors, the target language. In step 1003, target language characters and starting language characters are compared, and a correspondence between them is determined based on the visual similarity between the two characters being compared. If insufficient correspondence is determined, then step 1004 causes the process to return to step 1001 to select a neural network trained for a different starting language. However, if there is sufficient correspondence, then in step 1005 certain primary outputs are copied, and those copies are assigned to represent characters of the target language that do not identically exist in the starting language. Details of this illustrative process are discussed in the following sections.

Network Selection

Figure 5:
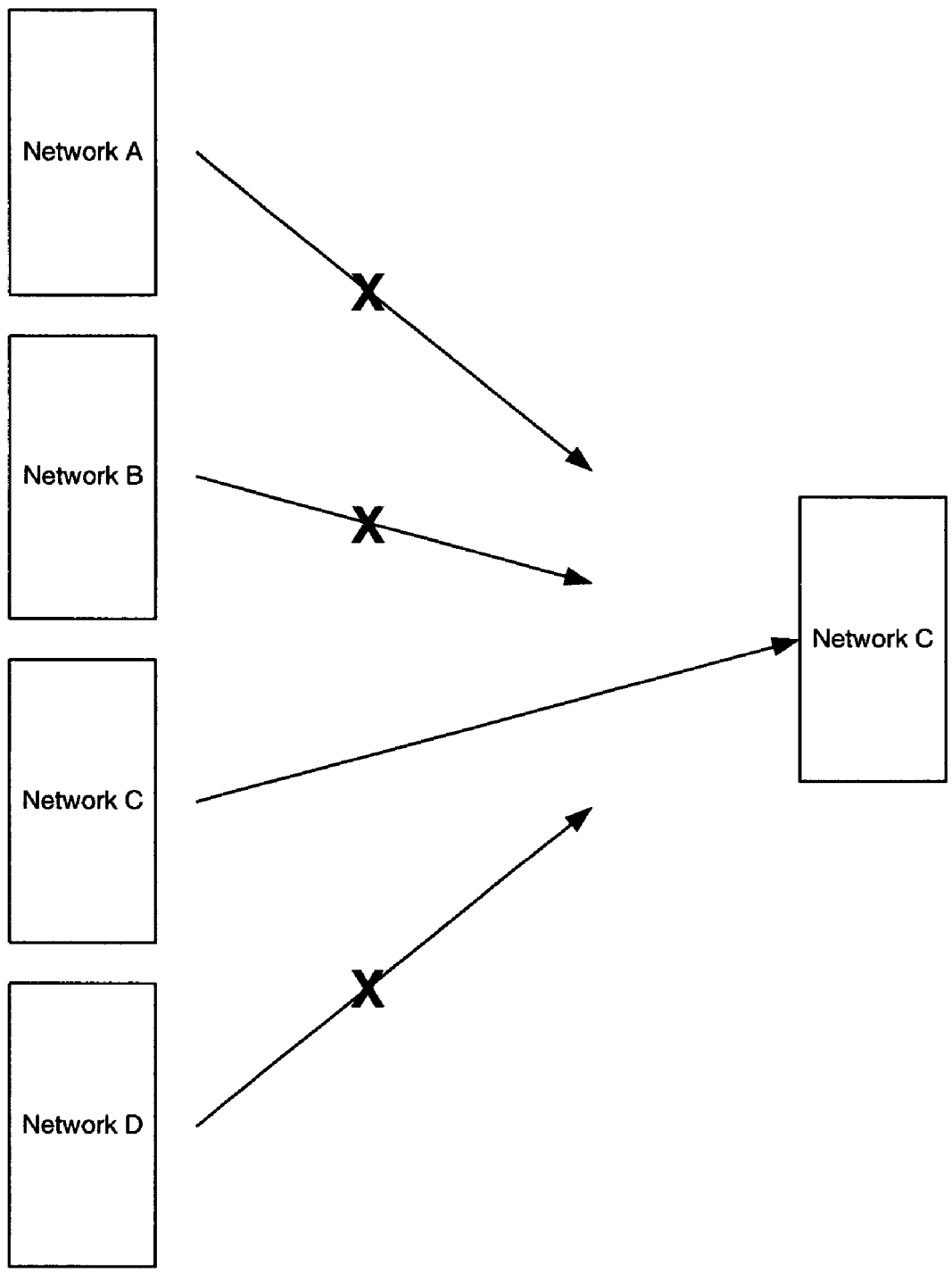
FIG. 5 shows an illustrative neural network selection process.

To re-use an existing neural network, a particular existing neural network should first be chosen from a set of existing neural networks. For example, as illustrated in FIG. 5, there may be a set of potential neural network candidates (Network A, Network B, Network C, and Network D). Assume that Network A is trained for Japanese writing, Network B is trained for Italian writing, Network C is trained for English writing, and Network D is trained for Hebrew writing. Factors that affect which existing neural network is chosen may include the language of each available existing neural network (the "starting language"), the training quality and accuracy of the neural networks, and the language for which a neural network is desired (the "target language"). For reasons that will become apparent as described further, the closer the starting language is to the target language, the better the result that generally may be expected. For instance, if the target language is Romanian, using Network A (i.e., the Japanese network) likely would not provide acceptable results. This is because most, if not all, Japanese characters generally look very different from Romanian characters. On the other hand, a reasonable starting language might be Network C (i.e., the English network). This is because the Romanian language has many characters in common with English, especially because they both are based on the same Latin alphabet. The main difference between the Romanian and English alphabets, for example, is the use of diacritical marks in Romanian. Generally speaking, the more characters of the starting language that have a one-to-one identical correspondence with a different character of the target language, the better. And, the more characters of the starting language that are very similar in appearance with a different character of the target language, the better.

A comparison of the target language Romanian with two potential starting languages, English and Hebrew, is shown in FIG. 6. The table of FIG. 6 shows an attempt to match characters of the target language, Romanian, with characters from English and Hebrew that look similar to each character of Romanian. As can be seen, it is relatively easy to find matching characters in English for all characters of Romanian. For example, many of the Romanian characters (e.g., "A", "B", and "C") are identical with English characters. Others of the Romanian characters, while not identical to any English character, are very close. For instance, the Romanian character "Ă" (which is the letter "A" with a breve mark) looks quite similar to the English character "A". And the Romanian character "Ţ" (which is the letter "T" with a cedilla mark) looks similar to the English character "T". On the other hand, there are not very many Romanian characters that look similar to Hebrew characters. While there are some good matches (such as the Romanian character "T" compared with the Hebrew character "ד", and the Romanian character "X" compared with the Hebrew character "א"), most are poor matches. For example, the Hebrew character "ק" is a relatively poor match with the Romanian characters "F" and "P". In fact, there are some characters in Romanian, such as "M", that simply have no good match with Hebrew whatsoever. A reasonable conclusion would be that Hebrew is a relatively poor choice as a starting language where the target language is Romanian; English would be a better choice as a starting language. It should be noted that the comparison in FIG. 6 is simplified by showing only the capitalized alphabet of Romanian. However, such a comparison may be made for any or all other characters of the target language as desired, such as numerals, symbols, and grammatical notations.

The comparison of a target language with candidate starting languages may be performed by a human and/or by a computer. For example, the comparison may rely on the subjective comparison made by a human. Alternatively or in addition, the comparison may rely on a computer algorithm that automatically makes a statistic-based comparison of characters in the target and starting languages that results in one or more suggested optimal starting languages based on user input of a target language. In addition, the comparison, whether performed subjectively by a human and/or automatically by computer, may result in a suggested one-to-one comparison of the characters in the target language with characters in one or more starting languages. For example, such a comparison, whether performed subjectively by a human and/or automatically by a computer, may result in a comparison table such as is shown in FIG. 6.

As will be discussed next, the results of the comparison of a target language with one or more starting languages may be used in deciding how to modify a starting language neural network, which ultimately may result in a handwriting recognizer for the target language.

Network Modification

Figure 7:
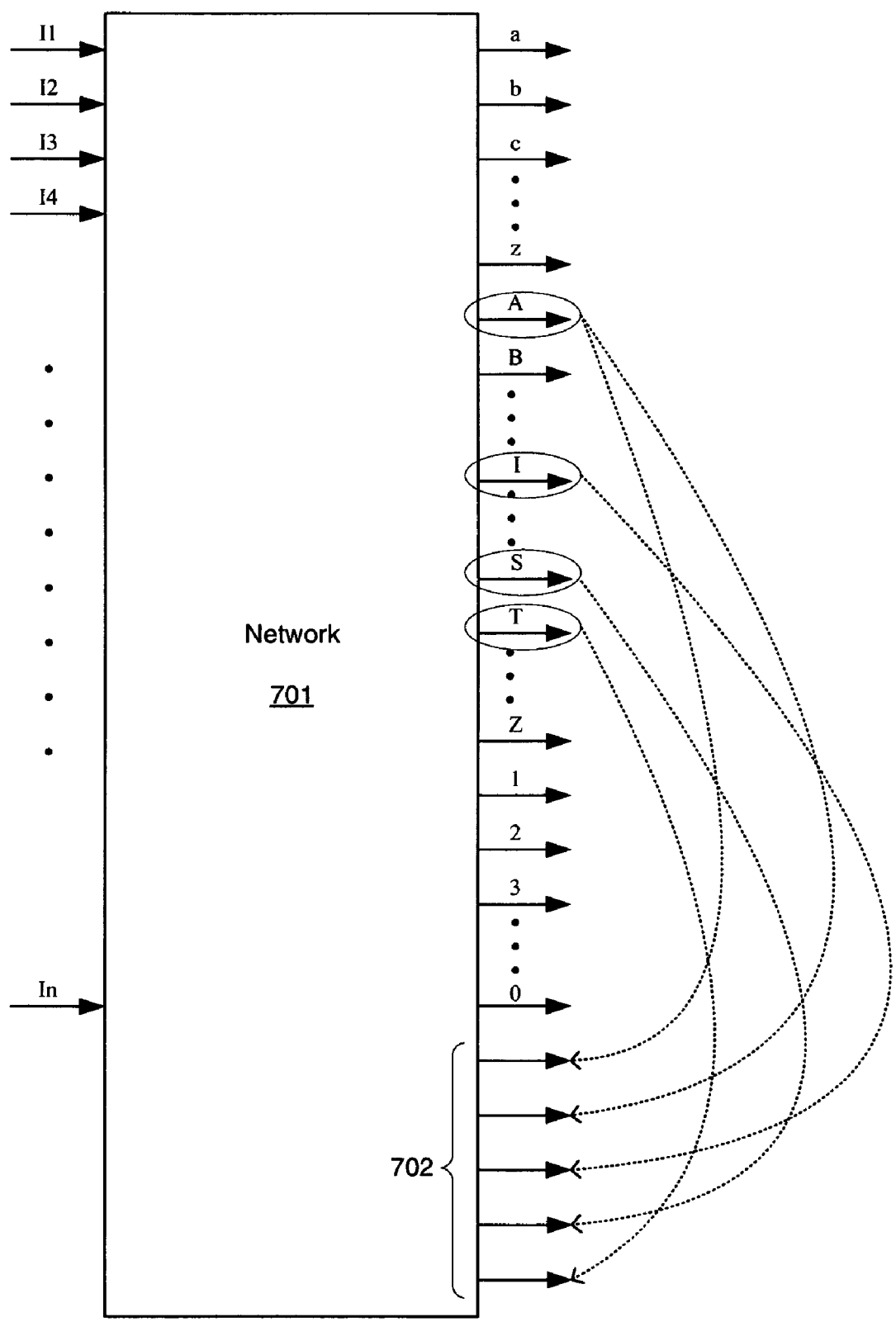
FIGS. 7 and 9 show an illustrative modification of a neural network.

Once it has been determined which starting language should be used, then an appropriate existing neural network trained for that starting language is chosen. Referring to FIG. 7, such an existing neural network 701 is shown (also including modifications, which will be discussed further below). In this example, neural network 701 is an English language-trained neural network (e.g., Network C in FIG. 5), and the target language is Romanian. As has been previously discussed with regard to FIG. 6, the characters of English and Romanian are relatively similar to one another. Because of this, relatively little modification would need to be made to neural network 701 in order to allow it to properly recognize Romanian characters. To modify neural network 701, copies (i.e., duplicates) 702 of certain primary outputs of neural network 701 are created. In other words, redundant output nodes are created.

Although a copy may be made of any primary output of neural network 701, in this example only certain primary outputs are copied. In particular, those primary outputs are copied that look similar to, but do not exactly match, a Romanian character. For instance, referring to FIG. 8, the English characters that are enclosed in boldface borders represent English characters that look similar to, but do not exactly match, a corresponding Romanian character. These English characters include "A", "I", "S", and "T". There are others, but only the capital letters are considered in FIG. 8. A goal in copying selected primary outputs is to create new outputs that may be used to represent target language characters that are not currently supported by the existing starting language neural network. Thus, two copies of the "A" primary output would be created to represent the Romanian characters "Ă" and "Â" (which is the letter "A" with a circumflex mark), respectively, one copy of the "I" primary output would be created to represent the Romanian character "Î", one copy of the "S" primary output would be created to represent the Romanian character "Ș", and one copy of the "T" primary output would be created to represent the Romanian character "Ț". In generating these copies 702, the modified neural network would thus have a larger total number of primary outputs.

Figure 12:
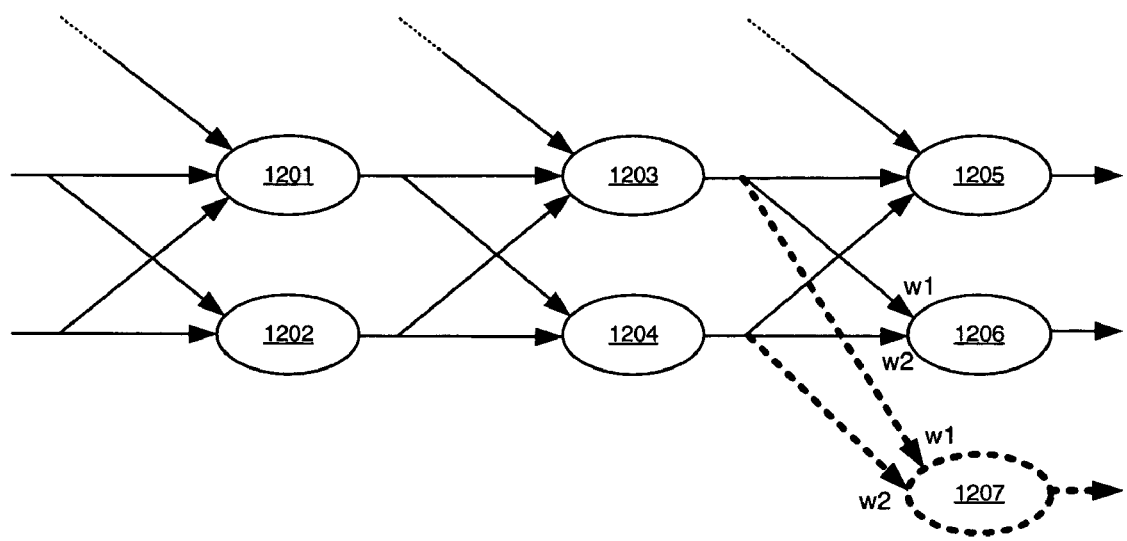
FIG. 12 is a functional block diagram of a portion of a neural network, illustratively showing how a primary output may be copied.

For example, FIG. 7 shows the newly-copied primary outputs described above: the "A" primary output has been copied twice to produce two new primary outputs, the "I" primary output has been copied once to produce one new primary output, the "S" primary output has been copied once to produce one new primary output, and the "T" primary output has been copied once to produce one new primary output. As will be discussed further below, each primary output is copied a certain number of times as needed to provide for new primary outputs for new characters that are similar to but are not included in the starting language. To copy a primary output, the weighted inputs assigned to the inputs of that output node which defines the primary output are copied The weights assigned to the copied weighted inputs are also copied. These weights connect one or more of the hidden nodes to that primary output node. The hidden nodes would thus remain undisturbed, except that one or more of them will now have additional output connections to account for the new copies of the weighted inputs to the primary output node. This concept is better explained with reference to FIG. 12, which shows a plurality of hidden nodes, including hidden nodes 1201-1204, of a neural network. The neural network also has a plurality of primary outputs, each corresponding to a different primary output node, such as primary output nodes 1205 and 1206. The architecture shown in FIG. 12 is merely illustrative, and only a portion of a neural network is shown for simplicity. In this example, the primary output corresponding to primary output node 1206 is to be copied. Primary output node 1206 has two inputs with weights w1 and w2. Thus, a new primary output node 1207 is created also having the same two inputs with weights w1 and w2. Of course, in practice, neural networks may provide additional or fewer inputs to each primary output node than as shown in FIG. 12.

One of ordinary skill in the art would, upon being instructed to, easily be able to copy a primary output. In doing so, the copied primary output would respond in an identical manner as the original primary output to all combinations of primary inputs. For instance, both new copied "A" primary outputs would respond in an identical manner as the original "A" primary output to all combinations of primary inputs.

Thus, neural network 701 has been modified to include additional primary outputs for each target language character not identical to a starting language character. Next will be discussed how the modified version of neural network 701 may be implemented in a handwriting recognizer configured to recognize the written target language.

Implementation in Recognizer/Training of Modified Neural Network

Figure 9:
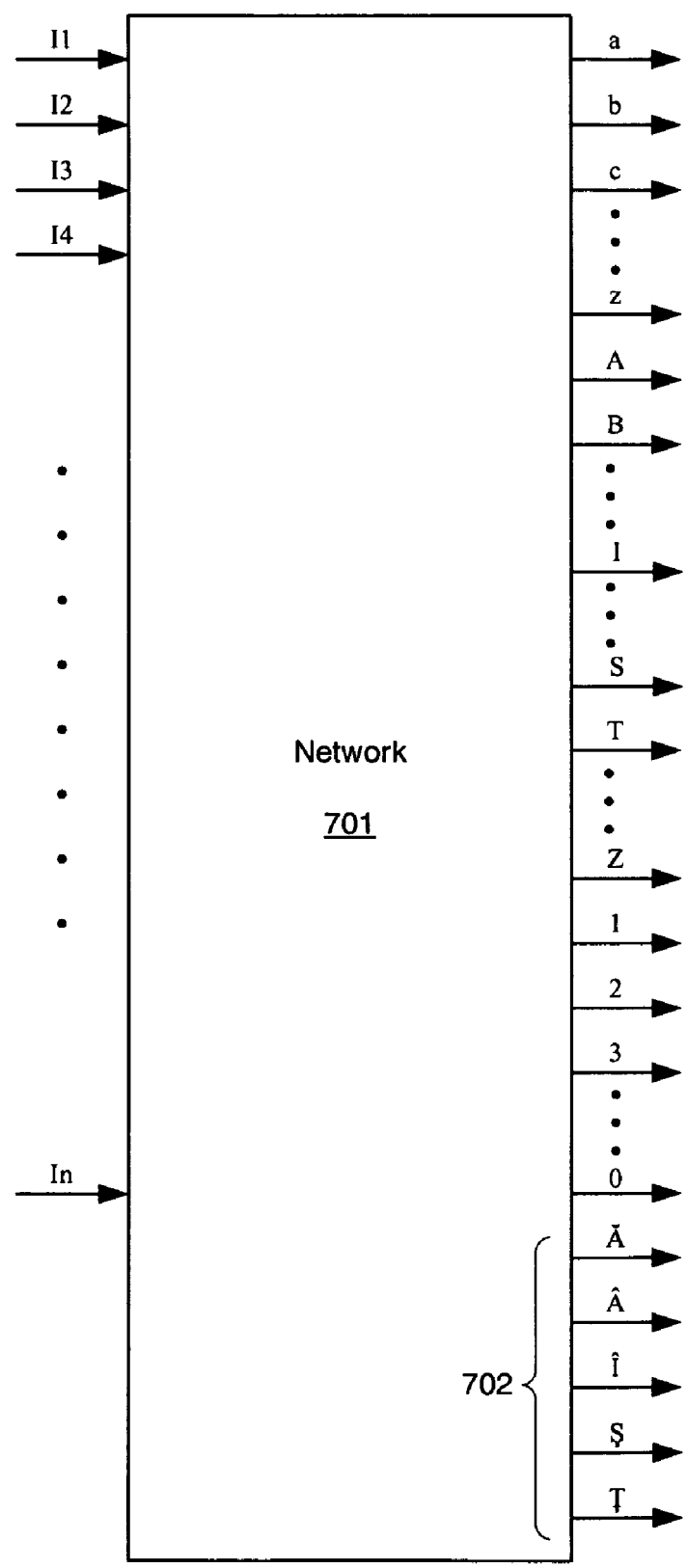

The modified version of neural network 701 may be used in a handwriting recognizer such as the handwriting recognizer shown in FIG. 2. To do so, post processing function 205 and language model 204 may be configured to properly interpret and respond to the newly-added primary outputs. Thus, the new primary output copies 702 may be coupled to the recognizer system in such a manner that the copies 702 are known to represent their respective new characters of the target language. In this example, each new copy 702 would be interpreted by post processing function 205 to represent "Ă", "Â", "Î", "Ș", and "Ț", respectively. This is shown in FIG. 9. As in FIG. 3, only some of the primary outputs are shown for simplicity. However, in practice it would be expected that the modified neural network would have a new primary output for each additional character to be added in the target language, as desired and appropriate.

In response to the handwritten input of the Romanian character "Ș", for example, both the "S" primary output and the "Ș" primary output would be selected by modified neural network 701. Post-processing function 205 may then correlate the handwritten input with language model 204 for both possibilities of "Ș" and "S", checking if the context indicates which one is more appropriate. It should be noted that language model 204 would, in this example, be replaced with a Romanian language model, including for example a dictionary list of Romanian words and notations. Because the handwriting recognizer would not be able to distinguish between a handwritten "Ș" and "S", and because some Romanian words may differ from each other only by the single character "Ș" or "S", this may or may not be a complete solution. In other words, while the handwriting recognizer would generally work, there may be situations where it would be more desirable to be able to distinguish between two similar characters such as "Ș" and "S".

Accordingly, it may be desirable to further train modified neural network 701 to recognize the difference between certain starting language characters and corresponding target language characters. This involves training modified neural network 701 such that the primary outputs that were once identical copies of the original corresponding primary outputs are no longer identical copies. Instead, the copies may each be selected responsive to a different combination of primary inputs than their corresponding original primary inputs. For example, modified neural network 701 may be trained with the handwritten characters "Ș" and "S" in a known way such that it may distinguish between the two characters. After training is complete, modified neural network 701 would ideally select only the "S" primary output in response to a handwritten "S", and only the "Ș" primary output in response to a handwritten "Ş". This training may be performed for any and all of the copied primary outputs.

Because the existing neural network 701, before modification, has already been trained for the starting language, the additional training needed for the target language may be expected to be less than training a neural network from scratch for the target language.

The "Super Network"

Figure 11:
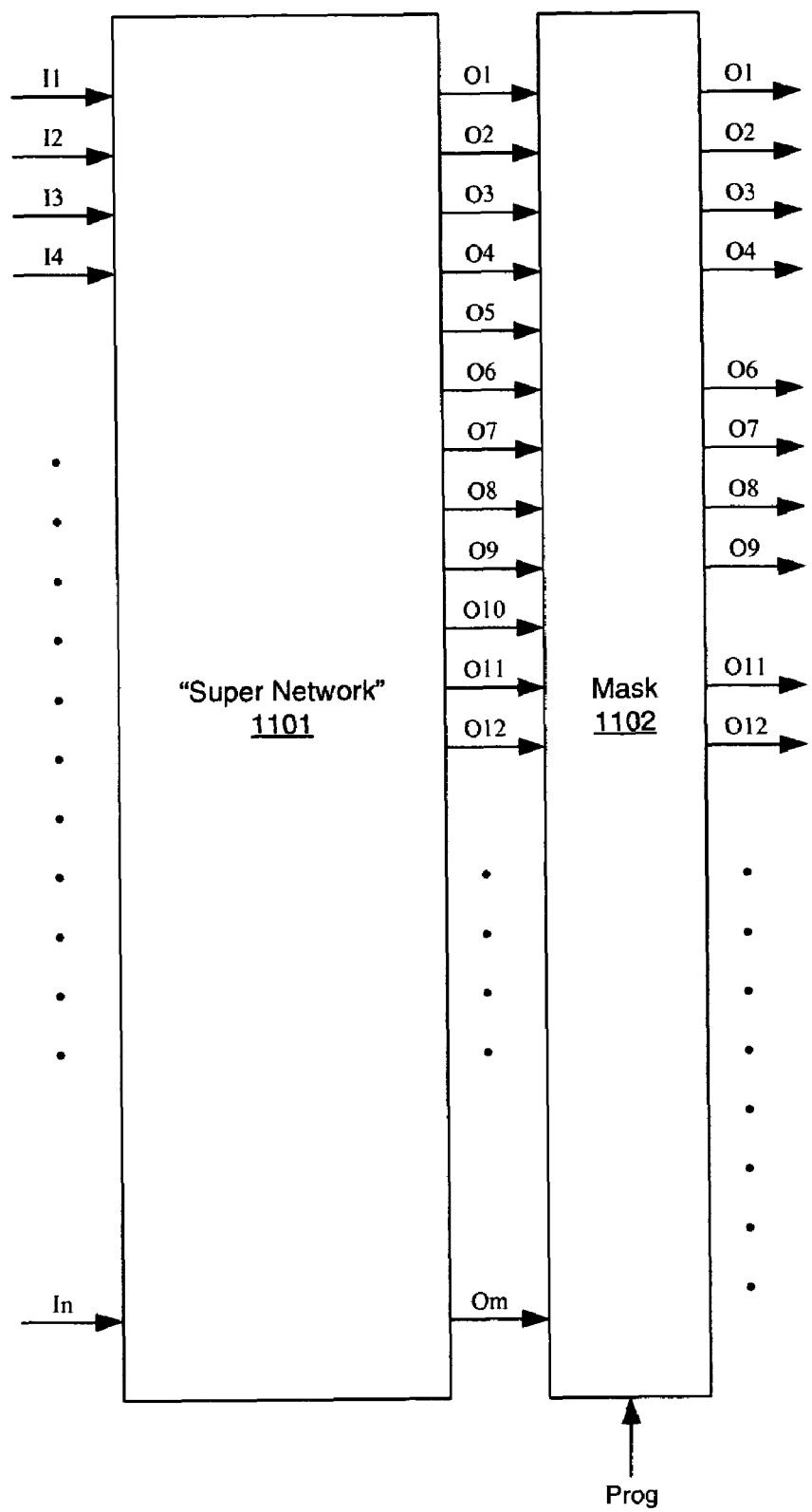
FIG. 11 shows an illustrative "super network" with masking.

Referring now to FIG. 11, a "super network" 1101 may be created using the above-described methodology or using any other process. For instance, neural network 701 may be expanded by iteratively copying primary outputs for a series of several different languages. The different languages may be related, such as all based on the Latin alphabet, or they may be unrelated. Regardless of how it is created, a large neural network 1101 may nevertheless be created that includes primary outputs O1:Om representing characters for a plurality of different languages. For example, neural network 1101 may include primary outputs for both the English character set and for the Romanian character set.

This large neural network 1101, along with a mask 1102, may be implemented in a handwriting recognizer system that is dynamically configurable to recognize a subset of all the languages for which neural network 701 is trained. Mask 1102 functionally acts to block a subset of primary outputs O1:Om. In practice, mask 1102 may be a switching network or any other hardware, software, and/or firmware that performs a selective masking function. Mask 1102 may determine which of outputs O1:Om to mask depending upon the content of a Prog signal. For example, Prog signal may be set to 0 for masking the character set of the Romanian language, and set to 1 for masking the character set of the English language. It should be noted that, at least in the present example, the English and Romanian character sets intersect, and this should be taken into account in determining which primary outputs to mask. Although the above example presents Prog as a binary value, Prog may be in any data format or even an analog signal. Prog may be user-configurable and may be dynamically changeable during handwriting recognition.

CONCLUSION

Thus, new ways of creating handwriting recognition functions have been described herein. By re-using existing neural networks, an extraordinary amount of time and money may be saved, in comparison with building and training new neural networks from scratch. Any of the methods and functions described herein may be implemented in hardware, software, and/or firmware, and may be performed manually by a human and/or automatically by a computer. Where methods and/or functions are implemented as software, they may be stored as computer-executable instructions on one or more computer-readable media, such as in system memory 130 and/or in removable media 152, 156.

Moreover, other types of networks other than neural networks may be used herein and modified in an analogous manner as described with regard to neural networks. For instance, a Bayesian network, a hidden Markov machine (HMM), a support vector machine (SVM), a template matcher, and/or a dynamic time warping (DTW) unit may be re-used and modified in the manner described herein to provide copies of outputs as appropriate.

What is claimed is:

1. A method for providing handwriting recognition functionality, comprising:
   providing a neural network having a plurality of primary outputs each corresponding to a different character of a first language;
   choosing a first primary output from the plurality of primary outputs; and
   adding a copy of the first primary output to the neural network.

2. The method of claim 1, wherein the neural network has a plurality of primary inputs, and wherein the copy of the first primary output responds to the primary inputs in an identical manner as the first primary output.

3. The method of claim 1, further including, after the step of adding, training the neural network such that the copy of the first primary output responds to the primary inputs in a manner different from the first primary output.

4. The method of claim 1, further including selecting the neural network from a plurality of neural networks, each of the plurality of neural networks being associated with a different language.

5. The method of claim 1, further including:
   choosing the first language; and
   choosing a second language different from the first language, wherein the step of choosing the first primary output includes choosing the first primary output depending upon the second language.

6. The method of claim 5, wherein the step of choosing the first primary output includes:
   comparing a character of the first language with a character of the second language; and
   if the character of the first language is visually similar, but not identical, to the character of the second language, then copying the first primary output.

7. The method of claim 5, further including providing a handwriting recognizer that includes the neural network, including the copy of the first primary output, and a language model of the second language.

8. The method of claim 1, further including providing a handwriting recognizer utilizing the neural network including the copy of the first primary output.

9. At least one computer-readable medium storing computer-executable instructions for providing handwriting recognition functionality, wherein the computer-executable instructions are for performing steps comprising:
   choosing a first network from a plurality of networks, wherein the first network is associated with a first language, and wherein the first network has a plurality of primary outputs each representing a different character of the first language;
   choosing a first primary output from the plurality of primary outputs of the first network, the first primary output being associated with one of the characters of the first language; and
   adding a copy of the first primary output to the first network.

10. The at least one computer-readable medium of claim 9, wherein the computer-executable instructions are further for performing steps including:
    receiving a first user input indicating a second language; and
    choosing the first language based on the second language.

11. The method of claim 10, wherein the step of choosing the first primary output includes:
    comparing a character of the first language with a character of the second language; and if the character of the first language is visually similar, but not identical, to the character of the second language, then copying the first primary output.

12. The at least one computer-readable medium of claim 9, wherein the first network has a plurality of primary inputs, and wherein the copy of the first primary output responds to the primary inputs in a manner identical to the first primary output.

13. The at least one computer-readable medium of claim 9, wherein after the first primary output is chosen, the first network includes a primary output that is a copy of the first primary output, wherein the first network is a neural network, and wherein the computer-executable instructions are further for performing steps including:

receiving a second user input comprising handwritten ink, the handwritten ink including a representation of a character of the second language that is not part of the first language; and in response to the second user input, training the first network such that a response of the copy of the primary output is modified.

14. The at least one computer-readable medium of claim 9, the at least one computer-readable medium further storing the plurality of networks.

15. The at least one computer-readable medium of claim 9, wherein the first network is a neural network, and the networks of the plurality of networks are each a neural network.

16. A handwriting recognizer, comprising:

a network having a first plurality of primary outputs each representing a different character of a first language and a second plurality of primary outputs each representing a different character of a second language;

a post-processing unit configured to interpret signals on the primary outputs; and a masking unit configured to selectively block one of a first subset or a second subset of the primary outputs from being interpreted by the post- processing unit.

17. The handwriting recognizer of claim 15, wherein the network, the post-processing unit, and the masking unit comprise software.

18. The handwriting recognizer of claim 15, wherein the first subset includes those of the primary outputs that represent characters of the first language but not the second language, and wherein the second subset includes those of the primary outputs that represent characters of the second language but not the first language.

19. The handwriting recognizer of claim 15, wherein the network is a neural network.

* * * * *